April 8, 1924.  1,489,474

C. J. BECKWITH

FASTENING DEVICE FOR CORRUGATED ROOFING AND THE LIKE

Filed Nov. 14, 1923

Charles J. Beckwith
INVENTOR.

WITNESS

BY
ATTORNEY.

Patented Apr. 8, 1924.

1,489,474

UNITED STATES PATENT OFFICE.

CHARLES J. BECKWITH, OF BROOKLYN, NEW YORK, ASSIGNOR TO JOHNS-MANVILLE, INCORPORATED, A CORPORATION OF NEW YORK.

FASTENING DEVICE FOR CORRUGATED ROOFING AND THE LIKE.

Application filed November 14, 1923. Serial No. 674,609.

*To all whom it may concern:*

Be it known that I, CHARLES J. BECKWITH, a citizen of the United States of America, residing at Brooklyn, in the county of Kings and State of New York, have invented certain new and useful Improvements in Fastening Devices for Corrugated Roofing and the like, of which the following is a specification.

My invention relates generally to devices for fastening objects to the edge of a plate-shaped support and is particularly designed to fasten corrugated metal roofing to the flat flange of an angle iron roof purlin. The object of the invention is to produce a fastening device or clip which can be used with standard threaded bolts and can be cheaply made of stock material, such as heavy strap iron or light bar iron or steel. The best form of such a device embodying my invention at present known to me is illustrated in the accompanying sheet of drawings in which.

Figure 1:
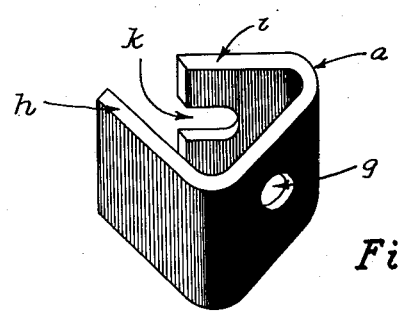
Fig. 1 is a perspective view of the clip.

Throughout the drawings like reference characters indicate like parts. $d$ is the sheet of corrugated roofing or siding, and $c$ the roof purlin or other support to which it is fastened. $b$ is a threaded bolt passing through a hole in the roofing $d$, and $e$ is a washer under the head of said bolt. $f$ is the usual nut on the threaded end of the bolt.

Figure 2:
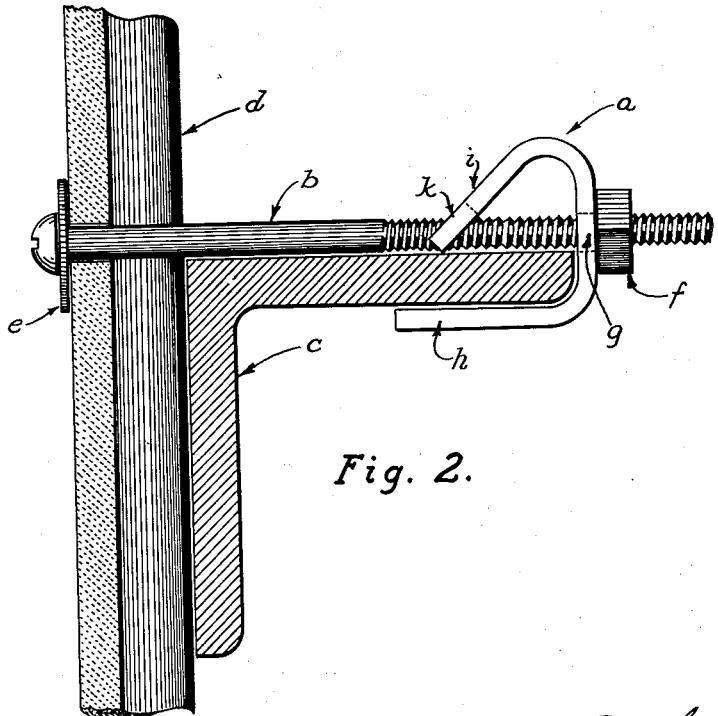
Fig. 2 is a cross-section through a sheet of corrugated roofing and a supporting roof purlin, showing the clip and cooperating bolt in operative position.

$a$ is a clip formed of a section of standard heavy strap or light bar iron or steel perforated at $g$ about midway of its length to receive bolt $b$. One end of this strap section, as $h$ is bent at right angles to the middle, perforated portion and the other end is bent inward at an acute angle to said middle portion, and preferably has a bifurcation or slot $k$ at its extreme end which will straddle bolt $b$ when the clip is in operative position as shown in Fig. 2.

The hole in the roofing $d$ is so located that bolt $b$, passing through it, extends across the plate-shaped support formed by the adjacent flange of purlin $c$. The clip $a$ is then slipped over the threaded end of the bolt in position such that end $h$ overhangs the flange of purlin $c$ and nut $f$ is screwed down.

The parts are so proportioned that when the bifurcated end $i$ of the clip $a$ rests against bolt $b$, or against the plate-shaped support formed by the purlin flange or against both and holds the perforated, middle portion of the clip at right angles to said bolt the other end $k$ of the clip will hook over and extend along close to the other face of the purlin flange. Thus clip $a$ forms a simple, compact swiveling hook, pivoted on the bolt, which may spring a little under compression from nut $f$, but cannot get out of position.

The clips $a$ can be cut from a long strip, punched and slotted, at one operation in a proper machine, and then bent cold in another operation. Consequently, they can be manufactured in quantity at small cost. They will not crack or split under excessive pressure from the nut, but afford a positive grip on the purlin, which cannot escape from this clamping action so long as the thread on the bolt holds. It has sufficient flexibility to be bent on the job by hammer blows to adjust it to variations in thickness of the purlin flange, and one standard size of the clip will adjust itself to several different sizes of purlins.

Obviously this device could be used to fasten objects, other than a sheet of corrugated roofing, to the edge of any plate-shaped support such as is afforded by the flange of the purlin here shown as one form of such supporting structure.

Having described my invention I claim:

1. In a device for fastening objects to a plate-shaped support by means of a bolt lying across the face of said plate-shaped support, a clip formed of a section of metal strap perforated at a point approximately midway of its length to permit the bolt to pass through it, and having one end bent at right angles to said perforated portion and extending along one surface of the plate-shaped support, while its other end is bent inward at an acute angle to said perforated portion, whereby said last mentioned end may bear on the side of the bolt when the parts are in operative position and serve as a stop to preserve said perforated portion in a position at right angles to the bolt.

2. A device such as set forth in claim 1 in which the end of the last mentioned portion of the clip is bifurcated to straddle the bolt and bears on the adjacent surface of the plate-shaped support.

3. In a device for fastening metal roofing to an angle-iron purlin, the combination, with a threaded bolt passing through a hole in the roofing, extending across the face of one flange of the angle-iron and provided with a nut on its projecting end, of a clip made of a section of metal strap perforated approximately midway of its length to permit said bolt to pass through it and having one end bent around and along the other surface of the angle iron flange while its other end is bent inward toward the bolt and bifurcated to straddle the same.

CHARLES J. BECKWITH.